United States Patent [19]
Rockwood et al.

[11] Patent Number: 5,842,500
[45] Date of Patent: Dec. 1, 1998

[54] OVERFILL PREVENTING VALVE

[75] Inventors: James Michael Rockwood, North Tonawanda; Paul Joseph Smith, Buffalo; David Earl Nitchke, Lancaster; John Michael Janak, West Seneca; Steven Francis Hawkes, Alden, all of N.Y.

[73] Assignee: Harsco Technologies Corporation, Fairmont, Minn.

[21] Appl. No.: 905,419

[22] Filed: Aug. 4, 1997

[51] Int. Cl.⁶ .......................... F16K 31/22; F16K 21/18; F16K 33/00
[52] U.S. Cl. .......................... 137/413; 137/415; 137/433; 137/614.2; 141/198; 251/44
[58] Field of Search ..................... 137/412, 413, 137/416, 430, 433, 614.2; 141/198; 251/44

[56] References Cited

U.S. PATENT DOCUMENTS

| | | | |
|---|---|---|---|
| 3,929,155 | 12/1975 | Garretson | 137/430 |
| 4,305,422 | 12/1981 | Bannink | 141/198 |
| 4,444,230 | 4/1984 | Van Mullem | 141/198 |
| 5,282,496 | 2/1994 | Kerger | 141/18 |
| 5,460,197 | 10/1995 | Kerger et al. | 137/39 |
| 5,472,012 | 12/1995 | Wood et al. | 141/198 |
| 5,487,404 | 1/1996 | Kerger | 137/413 |

*Primary Examiner*—George L. Walton
*Attorney, Agent, or Firm*—Eckert Seamans Cherin & Mellott

[57] ABSTRACT

An overfill preventing valve (20) is adapted to be operatively interposed in a flow path between a fluid source (21) and a compressed fluid storage cylinder (22) to prevent the cylinder from being overly filled. The improved valve includes an elongated tubular body having a first seat (25), a first space (26), a second space (28), a second seat (29), a third space (30), a third seat (31), a fourth space 37 and an entrance portion (32) communicating with a source. A passageway (33) continuously communicates the first and fourth spaces. The second and fourth spaces communicate with the interior of the cylinder. A float (36) is contained within the body for movement toward and away from the first seat in response to the liquid level in the cylinder. A valve member (38) is mounted on the body for sealed movement toward and away from the second seat. This valve member separates the first space from the second space. The valve member is biased to move away from the second seat. A piston (40), separating the third space from the fourth space, is mounted for sealed sliding movement therealong toward and away from the third seat. The piston is biased to move toward the third seat. The piston has a variable-area orifice communicating the entrance portion with the third space. The cross-sectional area of this orifice varies as a function of the direction of the flow. When it is desired to fill the cylinder and the float does not engage the first seat, incoming fluid displaces the piston away from the third seat and flows from the entrance portion into the cylinder via the fourth space. However, when the float sealingly engages the first seat, the valve member is caused to sealingly engage the second seat, and the piston is caused to sealingly engage the third seat to prevent further incoming flow from the source to the cylinder.

9 Claims, 8 Drawing Sheets

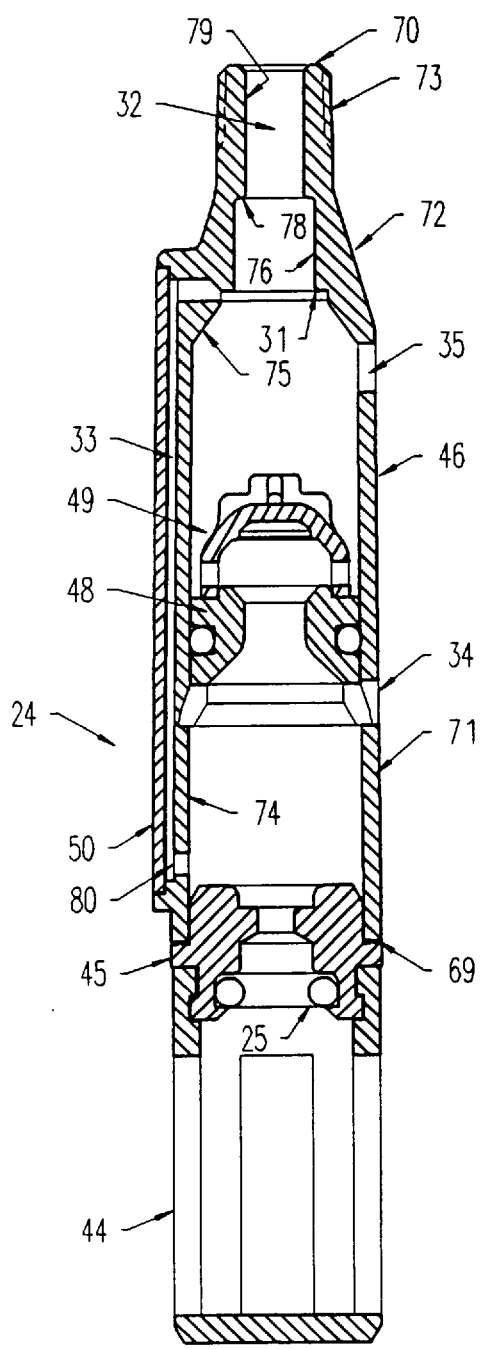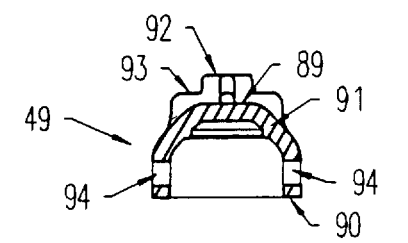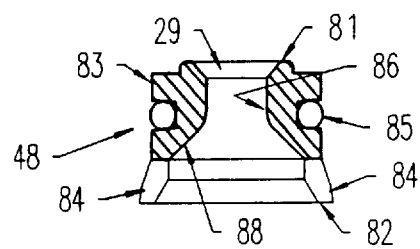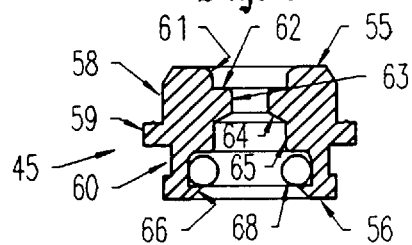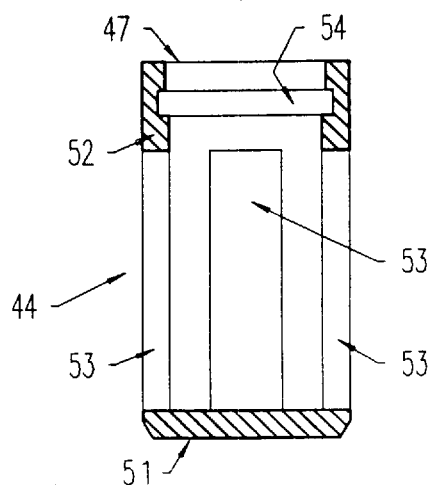

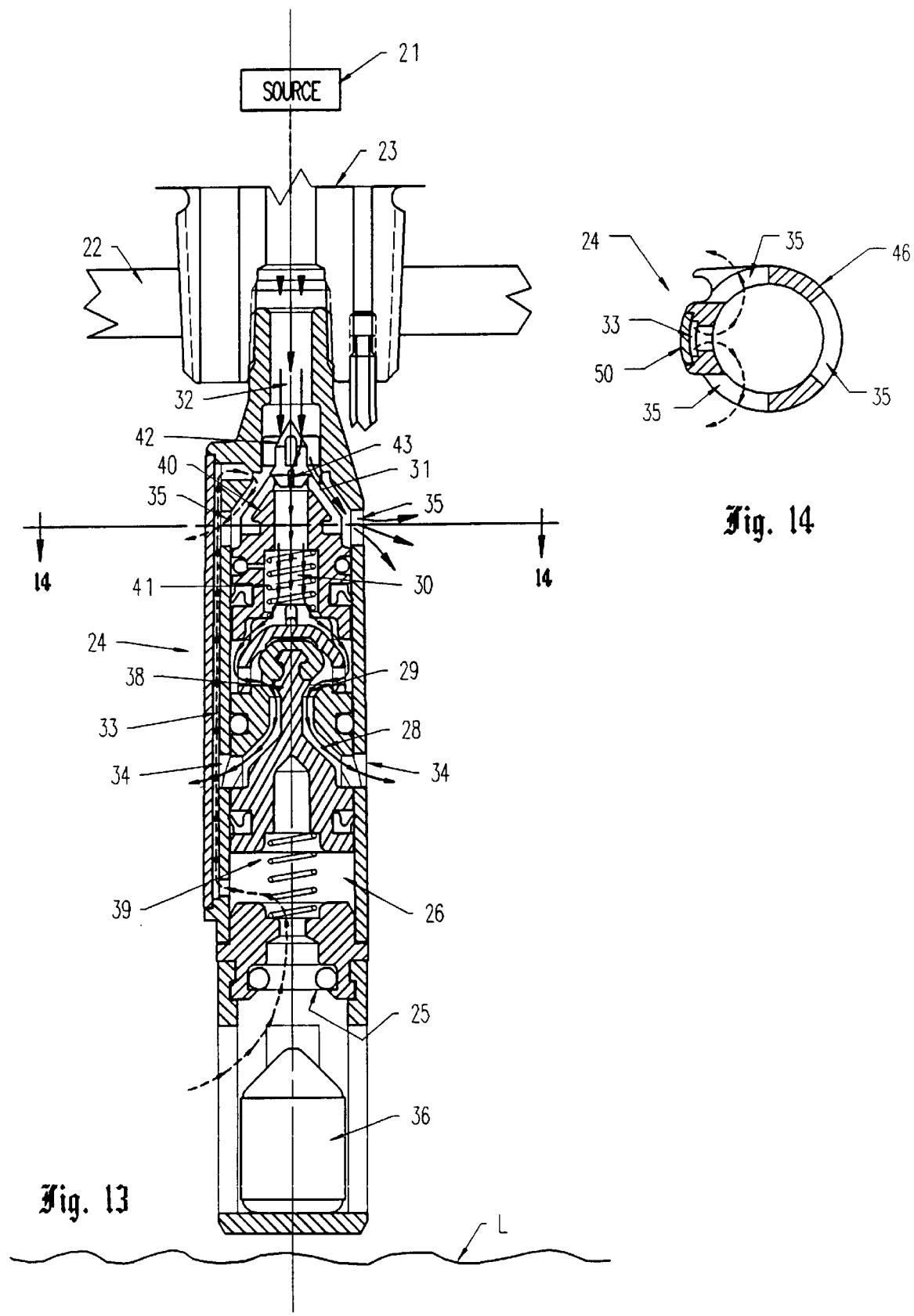

OVERFILL PREVENTING VALVE

TECHNICAL FIELD

The present invention relates generally to the field of compressed gas storage cylinders, such as those containing propane for use with various domestic appliances, and, more particularly, to an improved auxiliary valve that is adapted to be mounted on a main flow control valve within the cylinder to prevent the cylinder from being overly filled.

1. Background Art

Propane is a fuel commonly used with a number of domestic appliances, such as gas grills, burners, heaters, and the like. Propane is a favored fuel because the vapor phase can exist in pressure equilibrium with a liquid phase. The cylinder may store a large quantity of liquid fuel, and the vapor may be withdrawn from the headspace or ullage and provided to the service device or appliance. Propane is often sold in twenty-pound cylinders. A main control valve is mounted on the storage cylinder, and is used to control the normal flow of fluid from the cylinder to the serviced device or appliance.

These cylinders are reusable. After the contents have been exhausted, one may take the cylinder to a refilling station. The control valve is then connected to a suitable propane source, and propane is then pumped from the source through the main control valve into the cylinder. It is important that the cylinder not be overly filled. To this end, it has been proposed to provide a float-type device on an auxiliary valve to prevent the cylinder from being overly filled. See, e.g., U.S. Pat. No. 5,487,404. Additional details of cylinder valves, and auxiliary devices to prevent a fluid storage cylinder from being overly filled, are shown in U.S. Pat. Nos. 5,282,496 and 5,460,197. These types of prior art float-containing overfill-preventing valves have generally been of fragile and cumbersome design, which makes them unsuitable for bulk shipment. Moreover, these prior devices appear to be highly sensitive to the orientation of the cylinder during the refilling operation.

Accordingly, there is believed to be a need for an improved valve that prevents a fluid storage cylinder from being overly filled.

2. Disclosure of the Invention

With parenthetical reference to the corresponding parts, portions or services of the disclosed embodiment, merely for purposes of illustration, and not by way of limitation, the present invention broadly provides an improved valve (20) that is adapted to be operatively interposed in a flow path between a fluid source (21) and a compressed fluid storage cylinder (22) to prevent the cylinder from being overly filled.

The improved valve broadly includes: an elongated tubular body (24) sequentially including a first seat (25), a first space (26), a second space (28), a second seat (29), a third space (30), a third seat (31), a fourth space (37) and an entrance portion (32) communicating with the source. The body may further include a passageway (33) communicating first space (26) with fourth space (37). The second space (28) and the fourth space (37) communicate with the interior of the cylinder via openings (34, 35), respectively.

A float (36) is contained within the body for movement toward and away from the first seat (25) in response to the level of liquid (L) within the cylinder. The float is adapted to sealingly engage the first seat when the cylinder is upright and the liquid level rises above a predetermined level, as shown in FIG. 15. A valve member (38) is mounted in the body for sealed sliding movement toward and away from the second seat (29). This valve member separates the first space (26) from the second space (28), and is biased to move away from the second seat (29). A piston (40) is mounted on the body above the third space for sealed sliding movement toward and away from the third seat (31). The piston is biased to move toward the third seat by a spring (41). The poppet (42) has an orifice (43) communicating the entrance portion (32) with the third space (30). The cross-sectional area of the orifice varies as a function of the flow direction. When the flow is incoming (i.e., flowing from the source to the cylinder), the orifice has a relatively small area. When the flow is outgoing (i.e., from the cylinder to a serviced device or appliance), the orifice presents a larger area through which fluid may flow.

When it is desired to fill the cylinder and the float is separated from the first seat, incoming fluid displaces the piston away from the third seat and flows from the entrance portion into the cylinder via the fourth space. However, when the float sealingly engages the first seat, the valve member sealingly engages the second seat, and the piston is caused to sealingly engage the third seat to prevent further flow from the source to the cylinder.

Accordingly, the general object of the invention is to provide an improved valve for preventing a storage tank or cylinder from being overly filled.

Another object is to provide an improved cylinder valve, particularly suited for use with propane cylinders and the like, to prevent the cylinder from being overly filled with liquid propane.

Another object is to provide an improved cylinder valve that affords the capability of a greater outflow from the cylinder for a given cylinder pressure.

Another object is to provide an improved auxiliary valve that may be operatively mounted on a conventional cylinder valve, and that may be shipped in bulk quantities.

These and other objects and advantages will become apparent from the foregoing and ongoing written specification, the drawings and the appended claims.

BRIEF DESCRIPTION OF THE DRAWINGS

FIG. 2 is a detail view of the assembled body shown in FIG. 1.

FIG. 3 is a vertical sectional view of the float-retaining cage shown in FIG. 2.

FIG. 4 is a vertical sectional view of the lower seat member shown in FIG. 2.

FIG. 5 is a vertical sectional view of the intermediate seat member shown in FIG. 2.

FIG. 6 is a vertical sectional view of the upper spring support member shown in FIG. 2.

FIG. 13 is a fragmentary vertical sectional view of the improved valve shown in FIG. 1, but showing the positions of the various movable parts when the liquid level within the cylinder is less than a predetermined value, and the cylinder is being refilled through the valve.

FIG. 14 is a fragmentary horizontal sectional view thereof, taken generally on line 14—14 of FIG. 13, with parts removed for clarity.

DESCRIPTION OF THE PREFERRED EMBODIMENTS

Figure 1:
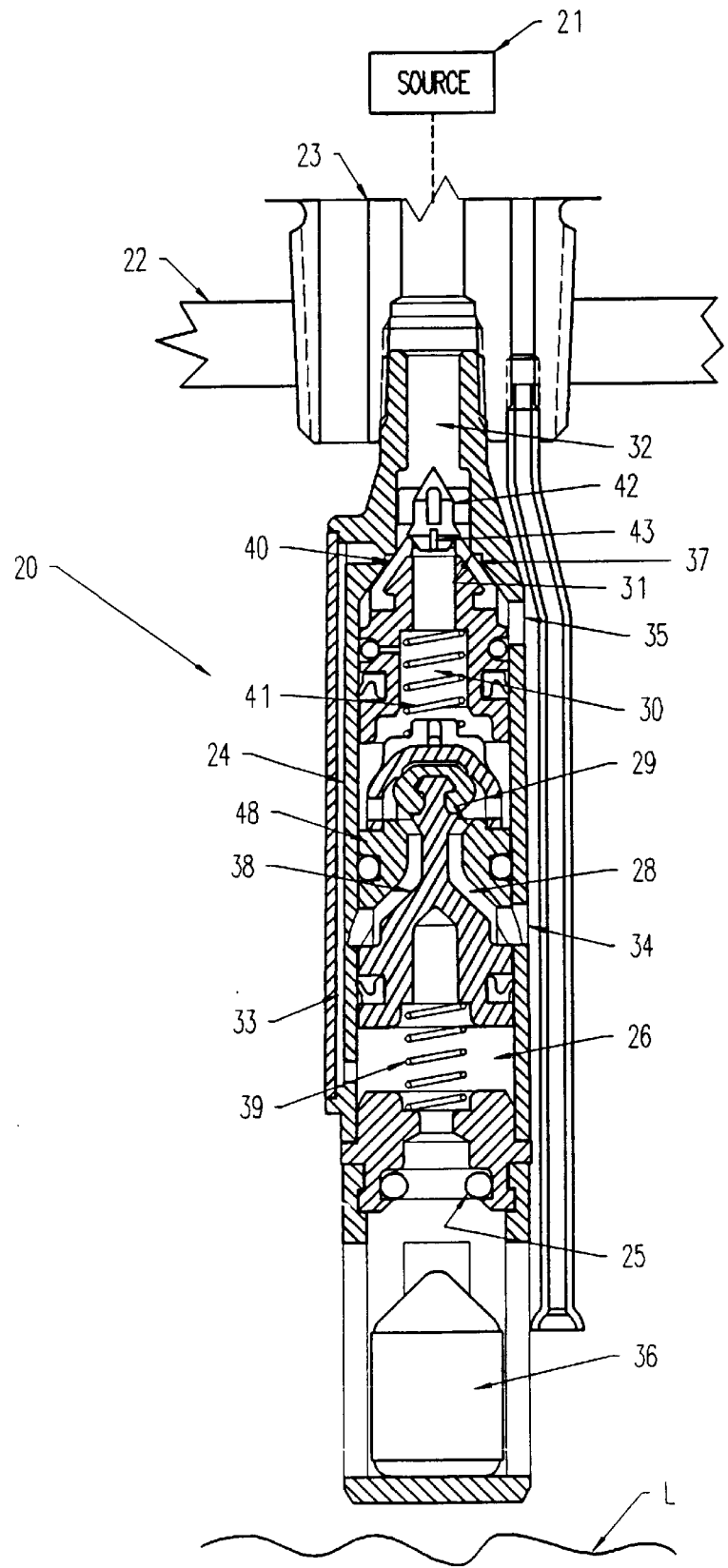
FIG. 1 is a fragmentary vertical view, partly in section and partly in elevation, of a first form of the improved valve, this view showing the first embodiment as having a lower float, an intermediate valve member, and an upper piston mounted within a vertically-elongated body.

At the outset, it should be clearly understood that like reference numerals are intended to identify the same structural elements, portions, or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

First Preferred Embodiment (FIGS. 1–16)

Referring now to the drawings, and, more particularly, to FIG. 1 thereof, the present invention broadly provides an improved valve, generally indicated at 20, that is adapted to be operatively interposed in a flow path between a fluid source, schematically indicated at 21, and a compressed fluid storage cylinder, fragmentarily indicated at 22, to prevent the cylinder from being overly filled. The serviced fluid may be a fuel, such as propane, capable of having its liquid phase exist in pressure equilibrium with its gaseous phase, or some other fluid (i.e., liquid or gas). Similarly, the cylinder may be a common twenty-pound storage cylinder or cylinder, such as commonly found on gas grills, campers, recreational vehicles, and the like, or may have some other size or shape.

In the drawings, the improved valve is operatively mounted on, and depending from, a conventional cylinder valve, generally indicated at 23, that is used to primarily control the flow into, and out of, the cylinder. Valve 23 is individually known in the art, and is representatively shown and described in U.S. Pat. No 5,330,155, the aggregate disclosure of which is hereby incorporated by reference.

Valve 20 is shown as broadly including a vertically-elongated assembled tubular body, generally indicated at 24, that sequentially includes: a first seat 25, a first space 26, a second space 28, a second seat 29, a third space 30, a third seat 31, a fourth space 37, and an entrance portion 32 communicating with the source. A vertical passageway, indicated at 33, continuously communicates the first space 26 with the fourth space 37. Second space 28 continuously communicates with the cylinder interior via body openings, severally indicated at 34, and fourth space 37 similarly communicates with the cylinder interior via body openings, severally indicated at 35.

Figure 15:
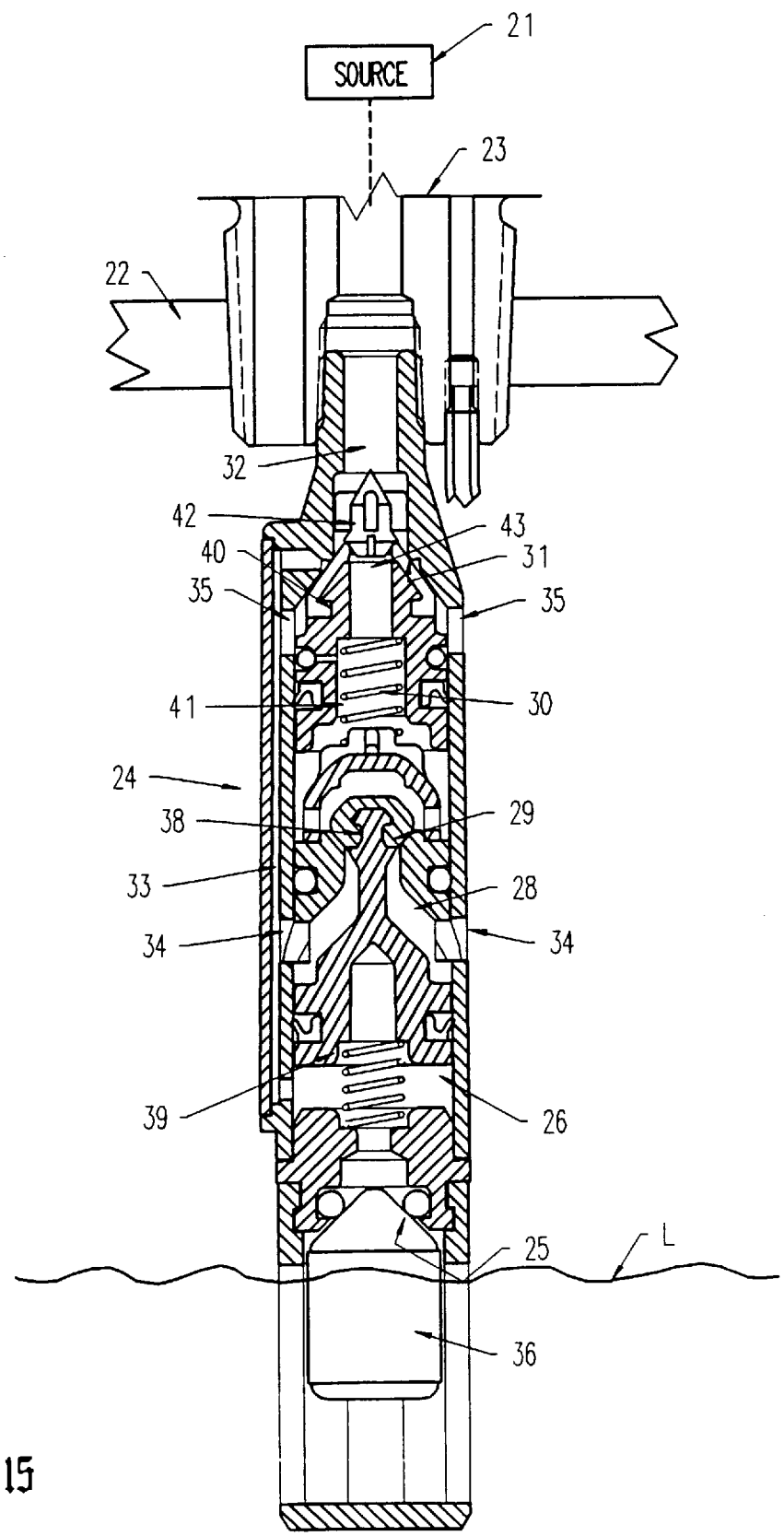
FIG. 15 is a fragmentary vertical sectional view, generally similar to FIG. 13, but showing the positions of the various movable parts when the liquid level within the cylinder has risen so that the float has sealingly engaged the first seat, the valve member has engaged the second seat, the piston has engaged the third seat, and the poppet has engaged the piston, all cooperating to prevent further flow into the cylinder.

A float, generally indicated at 36, is mounted on the body for vertical movement toward and away from first seat 25 in response to the level of liquid, schematically indicated at L, within the cylinder. As shown in FIG. 15, the float is adapted to sealingly engage first seat 25 when the cylinder is in a generally-upright position and the liquid level within the cylinder rises above a predetermined level.

An intermediate valve member, generally indicated at 38, is mounted on the body for sealed sliding movement therewithin toward and away from second seat 29. Valve member 38 sealingly separates first space 26 from second space 28. Hence, the volumes of the first and second spaces vary in a complimentary manner; i.e., as one increases, the other decreases. Member 38 is biased to move away from second seat 29 by spring 39.

The device is further shown as including an upper piston, generally indicated at 40, mounted on the body above third space 30 for sealed sliding movement therewithin toward and away from third seat 31. Spring 41 biases the piston to move upwardly toward the third seat. A poppet member, generally indicated at 42, is mounted in the entrance portion 32 for selective movement with, and relative to, the piston, to vary the size of an orifice, schematically indicated at 43 communicating entrance portion 32 with third space 30. The cross-sectional area of this orifice varies as a function of the direction of the flow (i.e., whether incoming or outgoing).

As shown in FIG. 13, when it is desired to fill the cylinder and the float does not engage the first seat, incoming fluid (i.e., fluid flowing from the source into the cylinder displaces the piston away from the third seat, and flows from the entrance portion into the cylinder via the fourth space (37) and through openings (35) while allowing flow through the orifice (43) to the third space (30), the second space (28) and into the cylinder through openings (34). However, as shown in FIG. 15, when the float sealingly engages the first seat, incoming flow causes the valve member to sealingly engage the second seat, and thereafter causes the piston to sealingly engage the third seat to prevent further incoming flow from the source to the cylinder.

Referring now to FIGS. 2–6, the assembled body 24 is shown as being vertically-elongated tubular member that includes: a lowermost cage 44, a lower seat member 45, a tubular wall portion 46, an intermediate seat member 48, a spring support member 49, and a plate 50 covering a vertical groove in wall portion 46, which plate and groove define passageway 33 communicating first space 26 with fourth space 37.

As best shown in FIG. 3, cage 44 is a vertically-elongated cup-shaped member having an annular horizontal upper end face 47, a horizontal circular lower end face 51, and a cylindrical side wall 52 extending therebetween. The side wall is provided with a number of vertically-elongated openings, severally indicated at 53, to allow fluid (i.e., liquid and/or gas) within the cylinder to enter the interior of the cage. An inwardly-facing annular groove 54 extends radially into wall portion 52 adjacent upper end face 47.

As best shown in FIG. 4, lower seat member 45 is a vertically-elongated specially-configured member having annular horizontal upper and lower end faces 55 and 56, respectively. Seat member 45 has an outer surface that includes, in pertinent part: an outwardly-facing vertical cylindrical surface 58 extending downwardly from upper end face 55, an annular flange 59 extending radially outwardly from surface 58, and an annular groove 60 extending radially into member 45 beneath flange 59. The lower seat member has a stepped axial through-bore that is sequentially bounded by: an annular convex surface 61 extending downwardly from the inner margin of upper end face 55, an upwardly-facing annular horizontal surface 62, an inwardly-facing vertical cylindrical surface 63, a downwardly- and inwardly-facing frusto-conical surface 64, and inwardly-facing vertical cylindrical surface 65 continuing downwardly therefrom, and a downwardly- and inwardly-facing frusto-conical surface 66 continuing downwardly therefrom to join the inner margin of lower end face 56. An annular groove extends radially into the lower seat member from bore surface 65 to receive and accommodate a seal 68. The lower seat member may be made to different axial lengths, depending upon the intended function to be served and contemplated operation.

Adverting now to FIG. 2, body portion 46 is shown as being vertically-elongated specially-configured tubular member having an annular horizontal lower end face 69 engaging the upper surface of lower seat member flange 59, an annular horizontal upper end face 70, and an outer surface that sequentially includes: a vertical cylindrical surface 71 extending upwardly from lower end face 69, an upwardly- and outwardly-facing frusto-conical surface 72, and an externally-threaded portion 73 continuing upwardly therefrom to join the outer margin of upper end face 70. Body part 46 has a stepped through-bore that sequentially includes: an inwardly-facing vertical cylindrical surface 74 extending upwardly from the inner margin of lower end face 69, a downwardly- and inwardly-facing frusto-conical surface 75, a vertical cylindrical surface 76, and a downwardly-facing annular horizontal shoulder 78, and a vertical cylindrical surface 79 continuing upwardly therefrom to join the inner margin of the upper end face. As seen in FIG. 2, the leftward portion of member 46 is thicker than the other peripheral portions. A vertically-elongated leftwardly-facing groove is provided in member 46. A plate-like cover 50 is adapted to selectively close this groove to define a vertically-elongated passageway 33 that continuously communicates first space 26 with fourth space 37. Openings 35 communicate fourth space 37 with the cylinder interior. A annular corner notch is provided in member 46 at the intersection of surfaces 75 and 76 to define annular seat 31. Member 46 is also shown as having openings, severally indicated at 34, communicating the second space with the cylinder interior, and a lower opening 80 communicating first space 26 with passageway 33.

As best shown in FIG. 5, the intermediate seat member 48 is also a vertically-elongated specially-configured tubular member having upper and lower annular end faces 81, 82, respectively. The cylindrical outer surface 83 of intermediate seat member 48 extends downwardly from the outer margin of upper end face 81, and has out-struck tangs 84, adapted to be snapped into openings 34. An annular groove extends radially into the intermediate seat member from outer surface 83 to receive and accommodate an O-ring 85 by means of which the joint between body inner surface 74 and seat member outer surface 83 may be sealed. The intermediate seat member also has a vertical through-bore that is sequentially bounded by: an upwardly- and inwardly-facing second seat surface 29 extending downwardly and inwardly from the inner margin of upper end face 81, a vertical cylindrical surface 86, and an downwardly- and inwardly-facing frusto-conical surface 88 continuing downwardly and outwardly therefrom to join the upper margin of out-struck tangs 84.

Referring now to FIG. 6, the spring support member 49 is shown as having a horizontal circular upper end face 89, an annular horizontal lower end face 90, a dome-shaped portion 91, and a support 92 mounted on the dome-shaped portion and extending upwardly therefrom. This support is shown as having an upwardly-facing annular horizontal shoulder surface 93. The dome-portion is shown as having a plurality of through-openings, severally indicated at 94, adjacent its lower end face 90.

The body is assembled as shown in FIG. 2. As assembled, cage upper end face 47 abuts the downwardly-facing surface of lower seat member flange 59. Similarly, the lower marginal end face of body tubular member 46 engages the upper annular surface of this flange. The lower seat member is thus operatively held between members 46 and 44. The intermediate seat member is snapped into engagement with body portion 46, with seat member tangs 84 snapped into holes 34. The spring support 49 rests on the intermediate seat member, and provides an elevated support for one end of spring 41.

Figure 7:
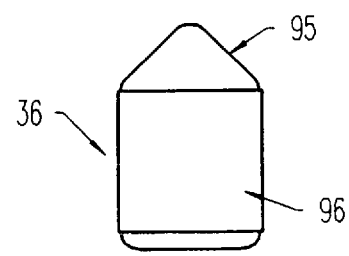
FIG. 7 is an elevation of the float shown in FIG. 1.

Referring now to FIG. 7, float 36 is shown as being a tubular member having a hemispherical or conical nose 95 extending upwardly from a lower cylindrical portion 96. As shown in FIGS. 1, 13, 15 and 16, the float is retained in cage 44 for upward and downward movement therewithin toward and away from first seat 25.

Figure 8:
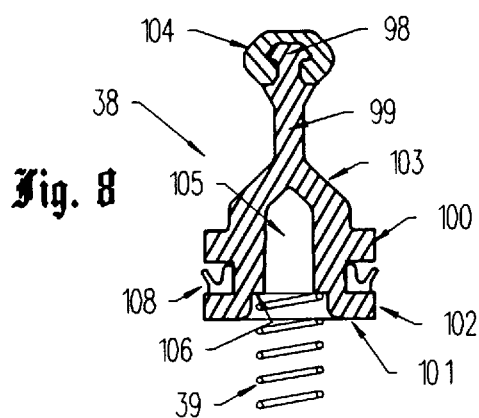
FIG. 8 is a vertical sectional view of the intermediate valve member shown in FIG. 1.

As best shown in FIG. 8, valve member 38 is a vertically-elongated specially-configured member having an uppermost head portion 98, an intermediate stem portion 99, and a lowermost piston portion 100. Member 38 is shown as having an annular horizontal lower end face 101. Member 38 also has an outer surface which sequentially includes: a vertical cylindrical surface 102 rising upwardly from the outer margin of lower end face 101, and a transitional portion 103 joining surface 102 with stem portion 99. The head portion 98 has a resilient seal 104. A stepped blind recess 105 extends upwardly into member 38 from its lower end face. This recess includes a shoulder surface 106 against which the upper end of spring 39 bears. The lower end of spring 39 bears against lower seat member surface 62. Thus, when assembled as shown in FIG. 1, spring 39 urges member 38 to move upwardly such that resilient seal portion 104 moves away from second seat 29. An annular groove extends radially into member 38 from surface 102 to receive and accommodate a cup seal 108, by means of which facing surfaces 74 and 102 may be sealed.

Figure 9:
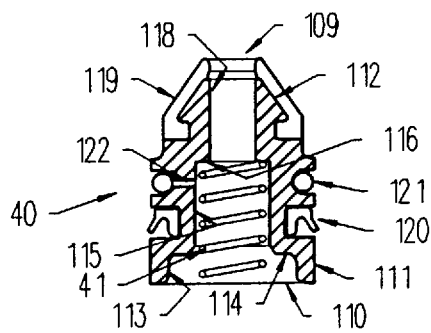
FIG. 9 is a vertical sectional view of the piston shown in FIG. 1.

Referring now to FIG. 9, upper piston 40 is also shown as being a vertically-elongated specially-configured tubular member having annular horizontal upper and lower end faces 109, 110 respectively. The piston outer surface includes: a vertical cylindrical surface 111 rising upwardly from the outer margin of lower end face 110, and an upwardly- and outwardly-facing frusto-conical surface 112 continuing upwardly therefrom. The piston has a stepped vertical through-bore which sequentially includes: a vertical cylindrical surface 113 extending upwardly from the inner margin of lower end face 110, a downwardly-facing annular horizontal surface 114, a vertical cylindrical horizontal surface 115, a downwardly-facing annular horizontal surface 116 against which the upper end of spring 41 may act, and a vertical cylindrical surface 118 continuing upwardly therefrom. A resilient cap 119 is mounted on the upper marginal end portion of the piston to selectively engage third seat 31. An annular groove extends radially into piston 40 from outer cylindrical surface 111 to receive and accommodate an annular cup seal, generally indicated at 120, by means of which facing surfaces 74 and 111 may be sealed. Another annular groove extends radially into the piston to receive and accommodate an O-ring 121. This O-ring is arranged to selectively cover a port 122 that communicates third space 30 with the cylinder interior via body holes 35. This O-ring functions as a one-way check valve to relieve an excess pressure differential between the third space and the cylinder.

Figure 10:
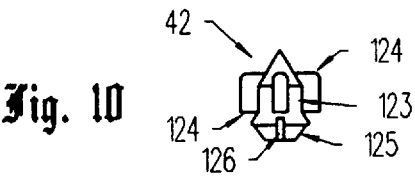
FIG. 10 is an elevation of the poppet shown in FIG. 1.
Figure 16:
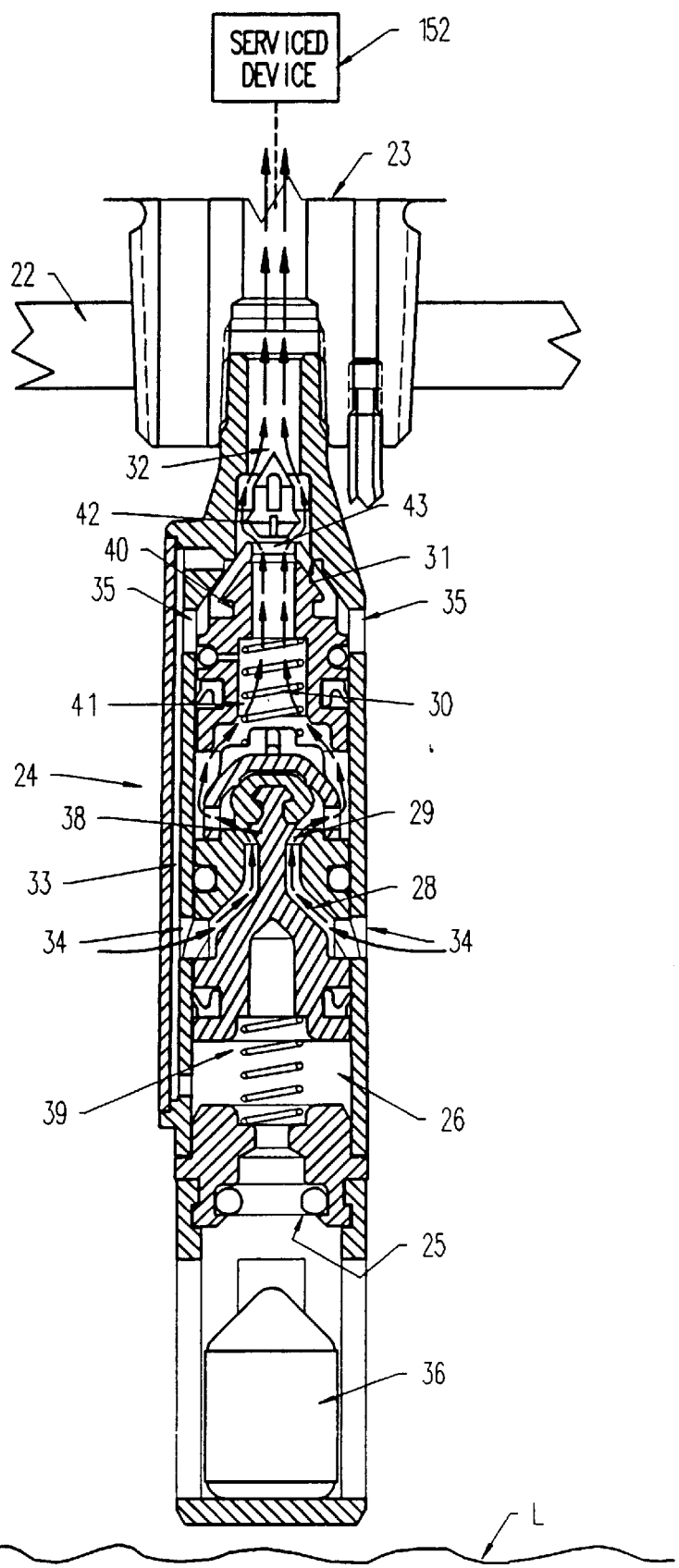
FIG. 16 is a fragmentary vertical sectional view thereof, generally similar to FIG. 15, but showing the positions of the various movable parts when fluid is withdrawn from the cylinder.

Referring now to FIG. 10, the poppet 42 is shown as being a vertically-elongated specially-configured member. The poppet has a central cylindrical body 123 from which three fins, severally indicated at 124, extend radially outwardly. The body has a downwardly- and outwardly-facing frusto-conical surface 125 arranged to engage the upper end of piston cap 119. A groove 126 is provided in the poppet conical portion to define a small-area first orifice between the poppet and the upper piston for permitting incoming fluid in entrance portion 32 to pass through the orifice to enter third space 30. On the other hand, as described infra, the poppet may separate and move away from the piston when it is desired to withdraw fluid from the cylinder, as shown in FIG. 16, thereby defining a large-area second orifice through which outgoing fluid may pass.

Figure 12:
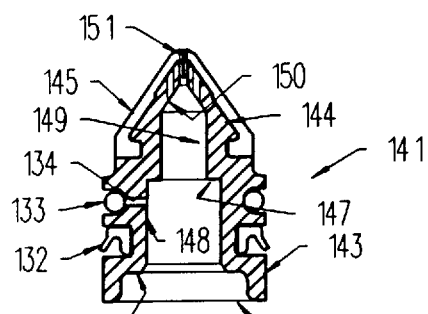
FIG. 12 is a vertical sectional view of a second alternative piston that might possibly be used in lieu of the piston shown in FIG. 9 and the poppet shown in FIG. 10.
Figure 11:
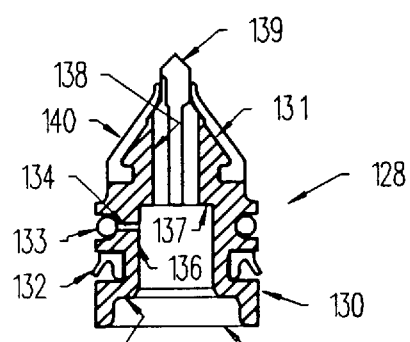
FIG. 11 is a vertical sectional view of a first alternative piston that might possibly be used in lieu of the piston shown in FIG. 9 and the poppet shown in FIG. 10.

FIGS. 11 and 12 depict alternative forms of upper pistons that might be used in lieu of piston 40 and poppet 42. In FIG. 11, piston 128 is again shown as being a vertically-elongated specially-configured member having, in pertinent part: an annular horizontal lower end face 129, an outer surface 130, and an upwardly- and outwardly-facing frusto-conical surface 131. An annular groove extends radially into piston 128 from outer surface 130 to receive and accommodate a cup seal 132 for sealing the joint between facing surfaces 74 and 130. Another annular groove extends radially into the piston to receive and accommodate an O-ring 133 that selectively covers a port 134, by means of which excess pressure in third space 30 may be dumped into the cylinder. Piston 128 also has a stepped axial through-bore that sequentially includes, in pertinent part: a downwardly-facing annular horizontal surface 137 against which the upper end of spring 41 may act, a vertical cylindrical surface 136, a downwardly-facing annular horizontal surface 135, and several holes, severally indicated at 138, communicating spring reaction surface 137 with frusto-conical surface 131. A needle-like member 139 has a head portion operatively held at the apex of surface 131 by material between holes 138. Resilient member 140 is mounted on the upper end of the piston. Thus, when the flow is incoming (i.e., from the source to the cylinder), a first orifice will be defined that will permit a relatively low flow from entrance portion 32 to third space 30. On the other hand, when the flow is outward (i.e., from the cylinder to a serviced device or appliance), fluid may more freely flow from the third space 30 to the entrance portion 32 through the larger-area orifice. Thus, this alternative piston 128 has a variable-area valve, created by the upper end of resilient member portion 140, to selectively vary the orifice areas between entrance portion 32 and third space 30 as a function of the direction of fluid flow therethrough.

FIG. 12 depicts yet another form of piston, generally indicated at 141, that may be used in lieu of piston 40 and poppet 42. This piston includes: an annular horizontal lower end face 142, a vertical cylindrical side wall 143 rising upwardly therefrom, and an upwardly- and outwardly-facing frusto-conical surface 144. Here again, appropriate grooves are provided to receive and accommodate cup seal 132 and O-ring 133, respectively. A cushioned member 145 covers the upper marginal end portion of the piston. The piston has a stepped vertical through-bore that is bounded by, in pertinent part: a downwardly-facing annular horizontal shoulder 147, an inwardly-facing vertical cylindrical surface 148, an inwardly-facing vertical cylindrical surface 149, an downwardly- and inwardly-facing frusto-conical surface 150, and a small opening 151 continuing upwardly therefrom to pass through the member. Downwardly-facing surface 147 is adapted to bear against the upper end of spring 41. Appropriate slits may be provided in the cushion to allow some flexibility such that the orifice will have a relatively small area to incoming flow, but may deflect outwardly to have a relatively large area to outgoing flow. Thus, alternative piston 141 has a duckbill-like valve.

Operation

The operation of the improved device is comparatively illustrated in FIGS. 13–16.

FIG. 13 depicts the condition of the improved valve when it is desired to fill the container from the source and the liquid level is sufficiently low that the float is separated from the first seat. FIG. 15 depicts a flow shutoff condition that occurs when the liquid level has risen, and the float sealingly engages the first seat. FIG. 16 depicts a withdrawal mode in which it is desired to supply fluid from the cylinder to a device or appliance.

Referring first to the fill mode shown in FIG. 13, it is assumed main cylinder valve 23 has been opened to allow incoming fluid to flow from the source into the cylinder. Fluid, represented by the darkened arrows, will then enter entrance portion 32, will displace the poppet and piston downwardly away from seat 31, thereby permitting fluid to flow between the piston and the body and to be discharged into the cylinder via lateral openings 35. At the same time, a portion of the flow passes through the restricted orifice 43 and enters third space 30. As indicated in the direction of the arrows, such fluid entering the third space passes around the spring support, and exits to the cylinder via openings 34. Note that spring 39 keeps valve member 38 displaced away from the second seat 29. In the condition shown in FIG. 13, the float is shown as resting in the bottom of the cage, away from the first seat.

Thus, the filling operation continues. As this occurs, the liquid level within the cylinder begins to rise. Incoming flow passing between piston 40 and the fourth seat 31 induces a vapor flow through passageway 33, as indicated by the dashed lines. Ultimately, the liquid level rises to a point that float 36 sealingly engages first seat 25, as shown in FIG. 15. Thereafter, continued incoming flow from the entrance portion between piston 40 and the third seat 31 will cause the pressure in the first space to be reduced, as vapor therewithin is drawn and entrained into the entering flow (as indicated by the dashed lines in FIG. 13). As this occurs, the pressure differential between spaces 28 and 26 overcomes the opposing bias of spring 39, and causes member 38 to move downwardly into fluid-tight sealed engagement with seat 29. This then obstructs the incoming flow passage communicating with openings 34.

The incoming flow will cause the pressure in third space 30 to substantially equalize with the source pressure. Thereafter, the resultant force due to the differential area between the piston diameter and the diameter at third seat 31 urges the piston to move upwardly into fluid-tight sealed engagement with the third seat. Note that the poppet remains seated on the piston. Thus, the device will automatically shutoff and prevent further incoming flow into the cylinder when the liquid level has raised to a predetermined level.

Referring now to FIG. 16, during the withdrawal phase, it is first assumed that the main valve 23 communicates with a serviced appliance or device, rather than the source.

After the main valve is connected to the service device, the main valve is simply opened to permit a flow from the cylinder to the serviced appliance 152. Vapor from within the cylinder may pass through openings 34 and around the member, upwardly through the piston, and displace the poppet off its seat as it passes upwardly through the entrance portion toward the serviced device. This operation is not dependent on float position.

Second Preferred Embodiment (FIGS. 17–21)

Referring now to FIGS. 17–21, a second form of the improved valve is shown as including many parts similar or analogous to parts previously described. Hence, for uniformity of description, the prime of the corresponding reference numerals first previously disclosed with respect to the first embodiment, is used to indicate corresponding parts, portions or structure of the second embodiment.

Figure 17:
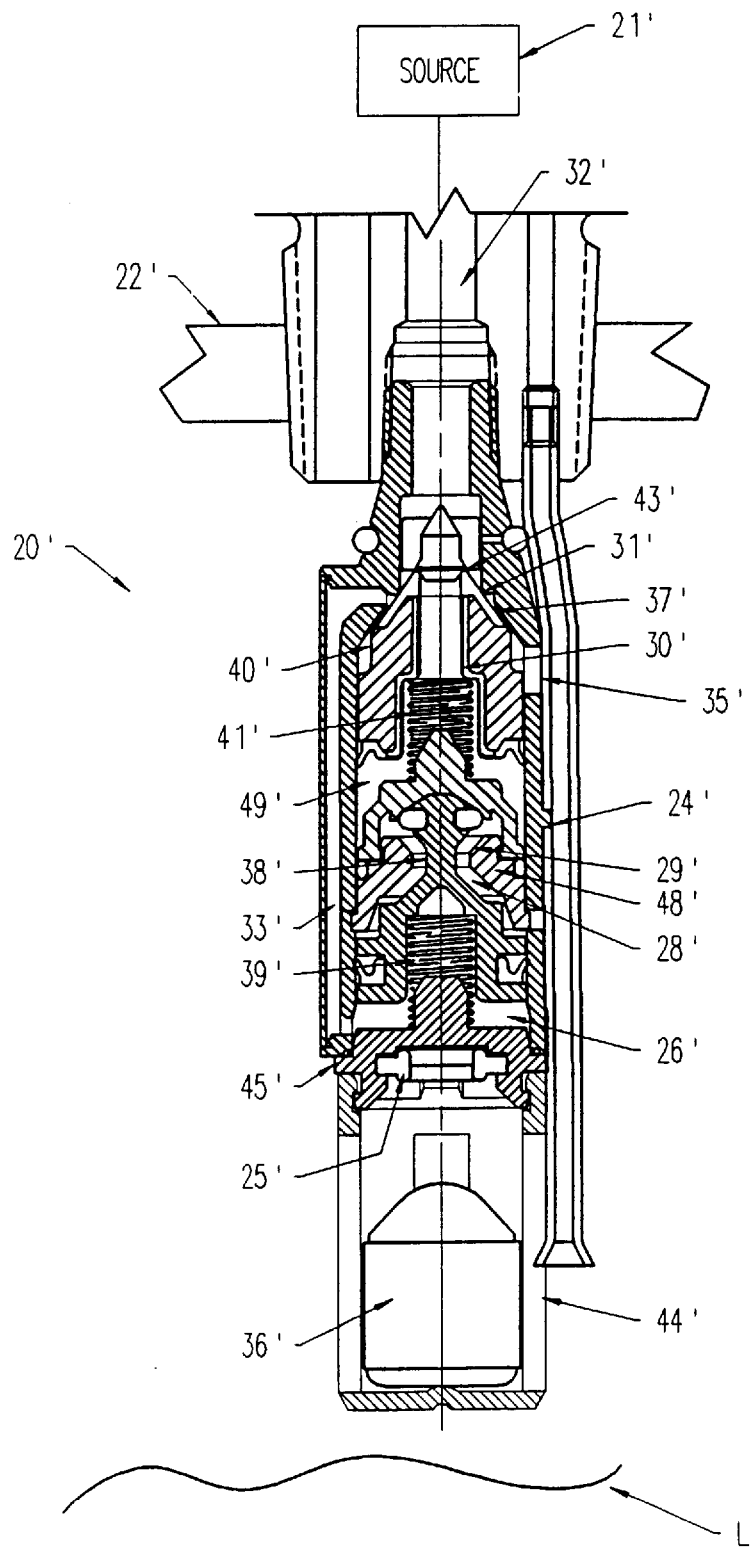
FIG. 17 is a fragmentary vertical view, partly in section and partly in elevation, of a second dorm of the improved valve, this view showing the second embodiment as having a lower float, an intermediate valve member, and an upper piston mounted within a vertically elongated body.

Referring now to FIG. 17, the second form of the improved valve, generally indicated at 20' is adapted to be operatively interposed in a flow path between a fluid source, 21' and a compressed fluid storage cylinder, fragmentarily indicated at 22' to prevent the cylinder from being overly filled.

In this form, the improved valve broadly includes a tubular body 24' sequentially including a first seat 25', a first space 26', a second space 28', a second seat 29', a third space 30', a third seat 31', a fourth space 37' and an entrance portion 32' communicating with the source. The body may further include a passageway 33' communicating first space 26' with fourth space 37'. The fourth space 37' communicates with the interior of the cylinder via openings 35'.

A float 36' is contained within the lower body cage (44') for movement toward and away from first seat 25' in response to the level of liquid (L) with in the cylinder. The float is adapted to sealingly engage the first seat when the cylinder is upright and the liquid level arises above a predetermined level. A valve member 38' is mounted in the body for sealed sliding movement toward and away from the second seat 29'. This valve member separates first space 26' from second space 28', and is biased to move away from second seat 29'. A piston 40' is mounted on the body above the third space for its sealed sliding movement toward and away from third seat 31'. The piston is biased to move toward the third seat by spring 41'. The poppet has an orifice 43' communicating the entrance portion 32' with the third space 30'. The cross-sectional area of the orifice again varies as a function of the flow direction. When the flow is incoming (i.e., is flowing from the source to the cylinder), the orifice has a relatively small area. When the flow is outgoing (i.e., from the cylinder to the service device or appliance), the orifice presents a larger area through which fluid may flow. Thus, the second embodiment, while structurally different from that of the first embodiment, may perform many of the same analogous functions.

Figure 18:
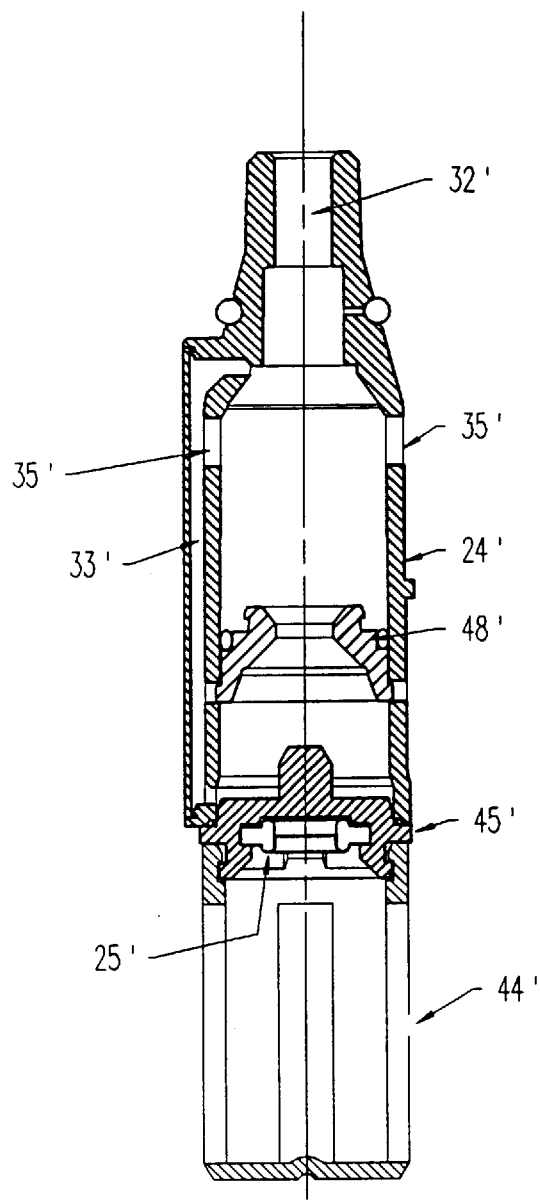
FIG. 18 is a detail view of the assembled body shown in FIG. 17.
Figure 21:
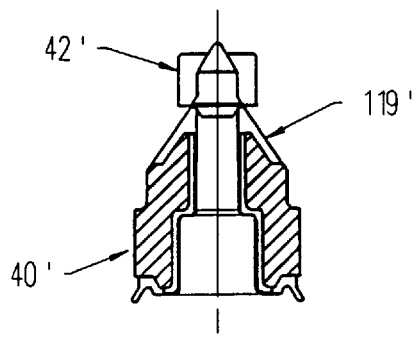
FIG. 21 is a vertical view, partly in section and partly in elevation, of the piston and poppet shown in FIG. 17.
Figure 19:
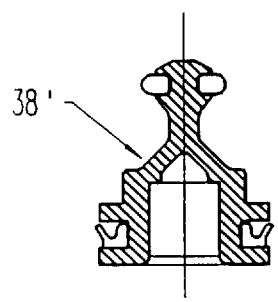
FIG. 19 is a vertical sectional view of the intermediate valve member shown in FIG. 17.

The assembled body is shown as a detailed view in FIG. 18, with the poppet, piston and intermediate valve member removed for clarity of illustration. A detailed view of the intermediate valve member 38' is depicted in FIG. 19. Here again, its structure and surfaces are readily apparent from the cross-sectional view.

Figure 20:
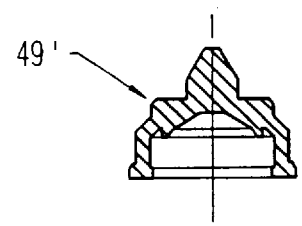
FIG. 20 is a vertical sectional view of the upper spring support member shown in FIG. 17.

The upper spring retainer as shown in FIG. 20, apart from other structure, again for clarity of illustration.

The piston 40' and the poppet 42' are collectively shown in FIG. 20. Here again, the primes of the same reference numerals previously used are again used to indicate like portions of this second embodiment.

Modifications

The present invention contemplates that many changes and modifications may be made. For example, the various parts and components may take the form shown, or may have some other form, as desired. The materials of construction are not deemed to be particularly critical, and may be readily changed or varied as desired. In lieu of the cylindrical float, hollow plastic or foam balls might alternatively be used. Similarly, other forms of biasing the member to move away from the second seat may be used. The O-ring 121 can be a seal of various shapes and located at any position to relieve excess pressure from third space 30 or space 32 to the cylinder.

Therefore, when all the preferred form of the invention as been shown and described, and severally modifications thereof discussed, persons skilled in this art will readily appreciate that various additional changes and modifications may be made without departing from the spirit of the invention, as defined by the following claims.

What is claimed is:

1. A valve adapted to be operatively interposed in a flow path between a fluid source and a fluid storage tank to prevent said tank from being overly filled, comprising:

an elongated tubular body sequentially including a first seat, a first space, a second space, a second seat, a third space, a third seat, a fourth space and an entrance portion communicating with said source, and further including a passageway communicating said first space with said fourth space, and wherein said second and fourth spaces communicate with an interior of said tank;

a float mounted on said body for movement toward and away from said first seat in response to a level of liquid within said tank, said float being adapted to sealingly engage said first seat when said tank is upright and said liquid level rises above a predetermined level, whereupon said communication between said first space and said interior of said tank is substantially shut off by said sealing engagement of said float with said first seat;

a member mounted in said body for movement relative thereto toward and away from said second seat, said member separating said first space from said second space, said member being biased to move away from said second seat and responsive to a pressure differential between said first and second spaces; and a piston mounted on said body and separating said third and fourth spaces for sealed movement therealong toward and away from said third seat, said piston being biased to move toward said third seat, said piston having an orifice communicating said entrance portion with said third space;

whereby when it is desired to fill said tank and said float does not engage said first seat, incoming fluid may displace said piston away from said third seat and flow from said entrance portion into said tank via said fourth space, but when said float sealingly engages said first seat, continued incoming flow from said fluid source through said fourth space causes pressure in said first space to be reduced via said passageway communicating therebetween, thereby creating said pressure differential between said first space and said second space sufficient to overcome said bias of said member, wherein said member is caused to sealingly engage said second seat and said piston is caused to sealingly engage said third seat to prevent further incoming flow from said source to said tank.

2. A valve as set forth in claim 1 and further comprising a cage mounted on said body for confining said float to move toward and away from said first seat.

3. A valve as set forth in claim 1 wherein fluid flowing through said passageway becomes entrained with incoming fluid flowing between said piston and said third seat.

4. A valve as set forth in claim 1 wherein said second seat faces toward the direction of incoming fluid flow.

5. A valve as set forth in claim 1 wherein said third seat faces away from the direction of incoming fluid flow.

6. A valve as set forth in claim 1 wherein the area of said orifice varies as a function of the direction of flow between said piston and third seat.

7. A valve as set forth in claim 6 and further comprising a poppet mounted for movement relative to said piston for varying the area of said orifice.

8. A valve as set forth in claim 1 and further comprising a resilient valve mounted on said piston for varying the area of said orifice.

9. A valve as set forth in claim 1 and further comprising a relief valve operatively arranged to relieve excess pressure within said third space and said entrance portion to said tank.

* * * * *